Patented Feb. 16, 1937

2,070,770

UNITED STATES PATENT OFFICE 2,070,770

HYDROGENATION OF ALKYL PHTHALATES

William John Amend, Wilmington, Del., assignor to E. I. du Pont de Nemours & Company, Wilmington, Del., a corporation of Delaware No Drawing. Application October 18, 1935, Serial No. 45,547

5 Claims. (Cl. 260—99.40)

This invention relates to catalytic processes and particularly to the hydrogenation of aromatic dicarboxylic esters. Specifically, it relates to a process for the hydrogenation of dialkyl esters of phthalic acids, to the corresponding dialkyl hexahydrophthalates.

Ring hydrogenation of esters of aromatic carboxylic acids has already been accomplished by the use of well-known hydrogenation catalysts, at moderate pressures and at temperatures seldom exceeding 150° C. (Brit. Pat. 286,201; French 649,626; U. S. 1,850,144) but these processes have been limited principally to the ethyl esters, and the low temperature and pressures employed were not conducive to rapid quantitative hydrogenation.

An object of this invention is to provide an improved process for hydrogenating dialkyl phthalates to the corresponding dialkyl hexahydrophthalates. Further objects are the production of certain new compositions of matter such as mixtures of dialkyl phthalates where the alkyl groups are obtainable from coconut oil or from the catalytic hydrogenation of carbon oxides. Other objects will appear hereinafter.

These objects are accomplished by the following invention which consists in the discovery that the dialkyl phthalates can be rapidly and quantitatively hydrogenated to the corresponding hexahydro compounds in the presence of highly active nickel catalysts by the use of relatively high temperatures and pressures.

The following examples serve to illustrate the invention but are not to be regarded as limitations thereof:

Example I

A catalyst consisting of metallic nickel supported on kieselguhr was prepared in the following manner: To a solution consisting of 5800 grams of $Ni(NO_3)_2$ dissolved in 40 liters of distilled water was added 3100 grams of Filtercel. The mixture was heated to 65–70° C. and a 3.5 per cent solution of $Na_2CO_3$ was added to the agitated mixture by spraying it over the surface at the rate of about 200 cc./minute until the pH of a filtered sample of the mother liquor was about 7.6–7.8. The precipitate thus formed was thoroughly washed with distilled water and dried at 110–120° C. The dried product was finely pulverized and reduced in a current of hydrogen at a temperature of 450 to 500° C.

Sixteen thousand eight hundred and forty grams of diethyl phthalate and 1200 grams of nickel catalyst prepared as described above were stirred in an autoclave at 160° C. under a hydrogen pressure of 2,000 pounds per sq. in. A very rapid absorption of hydrogen occurred during about 45 minutes followed by absorption at a reduced rate for two hours after which hydrogenation was substantially complete. After cooling the contents of the autoclave and filtering to remove the catalyst, a substantially quantitative yield of diethyl hexahydrophthalate was obtained.

Example II

Thirty-nine hundred grams of diamyl phthalate and 400 grams of the catalyst described in Example I were stirred and heated in an autoclave to 160° C. and hydrogen was admitted to a pressure of 2,000 pounds per sq. in. A rapid absorption of hydrogen took place immediately with evolution of heat which carried the temperature of the reactants to 180° C. in a few minutes. Hydrogen absorption stopped sharply at the end of 45 minutes and the hydrogenated product, after filtering out the catalyst, consisted of substantially pure diamyl hexahydrophthalate.

Dimethyl phthalate was quantitatively hydrogenated to dimethyl hexahydrophthalate in a similar manner at temperatures of 180°–200° C.

Example III

A 4,000 gram charge of dioctyl phthalate was quantitatively hydrogenated to dioctyl hexahydrophthalate in 30–45 minutes in an autoclave at 180°–200° C. and 2,000 pounds pressure by the use of 300 grams of a highly active metallic nickel catalyst prepared by caustic extraction of a finely powdered alloy of nickel and aluminum as described in U. S. Patent 1,628,190.

Example IV

Mixed dialkyl phthalates were prepared by esterifying phthalic acid with a crude mixture of the 5 to 8 carbon primary and secondary alcohols boiling within the range of 133° C. to 180° C. at atmospheric pressure obtained by catalytic synthesis from carbon monoxide and hydrogen. This mixture of alcohols has an average molecular weight of 120 which corresponds to an average of 7.3 carbon atoms. The dialkyl phthalates prepared from this mixture had a specific gravity of 1.0041 at 25° C. and a refractive index of 1.4876 at 25° C. Four thousand grams of the mixed phthalates so prepared were hydrogenated with 400 grams of the nickel catalyst described in Example I by heating and stirring the mixture in an autoclave at 180° C. and applying a hydrogen pressure of 2000 pounds per square inch. Rapid hydrogen absorption occurred accompanied by an evolution of heat which carried the temperature of the reactants to 240° C. Hydrogen absorption terminated abruptly after 15 minutes, and a substantially quantitative yield of the dialkyl hexahydrophthalates was obtained. The hydrogenated product obtained was a moderately viscous, pale yellow to water white, liquid with a specific gravity of 0.9606 at 25° C. and a refractive index of 1.4566 at 25° C. The product obtained is useful as a plasticizer for cellulose derivatives, particularly for nitrocellulose.

Example V

A mixture of dialkyl phthalates was prepared by esterifying phthalic acid with a mixture of the 8 to 18 carbon straight chain primary alcohols boiling within the range of 98 to 220° C. at 20 mm. pressure, derived from the liquid or vapor phase carboxyl hydrogenation of coconut oil or of the corresponding mixture of acids. The approximate composition of this mixture of alcohols is as follows:

| | Per cent |
|---|---|
| Octyl alcohol | 10 |
| Decyl alcohol | 5 |
| Dodecyl alcohol | 45 |
| Tetradecyl alcohol | 15 |
| Hexadecyl alcohol | 10 |
| Octadecyl alcohol | 15 |
| Total | 100 |

Four thousand grams of the mixed dialkyl phthalates prepared from the aforementioned alcohols, said phthalates having a specific gravity of 0.9325 at 25° C. and a refractive index of 1.4773 at 25° C. were hydrogenated with 400 grams of nickel catalyst described in Example I under the conditions shown in Example IV. A quantitative yield of the corresponding dialkyl hexahydrophthalates was obtained. The hydrogenated product obtained was a thick, viscous, water white oil having a specific gravity of 0.9148 at 25° C. and a refractive index of 1.4600 at 25° C. The product is useful as a plasticizer for cellulose derivatives, particularly for nitrocellulose.

Example VI

Two hundred grams of methyl-ethyl phthalate was stirred in a small autoclave with 10 grams of the nickel catalyst described in Example I, and heated to 160° C. Hydrogen was then admitted to a pressure of 2,000 pounds per square inch. The temperature rose rapidly to about 200° C. and a rapid hydrogen absorption occurred which terminated abruptly after about 25 minutes. After filtering out the catalyst, the product was found to be substantially pure methyl-ethyl hexahydrophthalate.

The dimethyl and diethyl esters of homophthalic acid were also quantitatively hydrogenated to the corresponding hexahydro derivatives, under the same conditions employed for hydrogenating methyl-ethyl phthalate.

Example VII

Eighteen hundred grams of diethyl terephthalate dissolved in 3,000 grams of 95 per cent ethyl alcohol was mixed with 200 grams of nickel catalyst and hydrogenated at 200° C. under 2,000 pounds hydrogen pressure whereby the diethyl terephthalate was converted to diethyl hexahydroterephthalate.

In a similar manner, dimethylisophthalate was converted at 170–190° C. to the corresponding dimethyl hexahydroisophthalate.

Although certain specific applications of this invention have been given in the above examples it is not limited by them. The invention may be applied not only to the ring hydrogenation of esters of orthophthalic acid but also to the esters of terephthalic, homo-phthalic, and iso-phthalic acids. By the use of the term "phthalic acid" as used herein and in the claims, I mean to include all of these various phthalic acids.

The phthlates employed in this process are not limited to the lower alkyl phthlates but include the higher alkyl phthlates containing up to as many as 18 carbon atoms in the alkyl radicals; examples of such are octyl, dodecyl, and octadecyl phthlates and mixtures of alkyl phthalates, such as are obtained by esterifying phthalic acid with the mixed higher alcohols obtained by catalytic synthesis from carbon monoxide and hydrogen, or from the catalytic hydrogenation of acids and esters.

Many well-known hydrogenation metals, particularly nickel, platinum, or palladium or their compounds, prepared by widely differing methods may be used for this reaction. I prefer, however, to use nickel supported on kieselguhr prepared as described in Example I above, or the highly active nickel prepared by alloying metallic nickel with metals, such as silicon or aluminum in various proportions, then dissolving the aluminum or silicon from the alloy by means of a solvent which will not attack the nickel thereby leaving it in a finely divided elementary state, which does not require pre-reduction in hydrogen, oil, or other reducing media. Such a catalyst is described in U. S. Patents 1,563,587 and 1,628,190 granted to Murray Raney.

The amount of catalyst required to effect quantitative hydrogenation in a very short time will generally not exceed an amount approximately equal to ten per cent by weight of the compound to be hydrogenated. Depending on the purity of the material, particularly with respect to catalyst poisons, such as sulfur compounds, and the conditions of temperature and pressure employed, the amount of catalyst may be reduced to five per cent or less. Ordinarily the preferred charge of catalyst will be between five and ten per cent.

The hydrogen pressure of 2,000 pounds per square inch specified in the above examples represents the mean pressure employed. In any given run the pressure limits fluctuated between 1,000 pounds and 3,000 pounds per square inch owing to the rapid pressure drop caused by hydrogen absorption and the necessity for restoring the pressure at regular intervals. Although the preferred hydrogenation pressure is about 2,000 pounds per square inch, this may be varied from as low as 750 pounds to as high as 5,000 pounds per square inch without materially affecting the process, although it is preferred not to allow the pressure to drop much below 1,500 pounds.

The temperature of hydrogenation should not be less than 160° C. since lower temperatures materially retard the rate of reaction. It is best to carry out the hydrogenation in the range of 160–240° C. and preferably between 180–200° C. It is undesirable to let the reaction temperature exceed 250–260° C.

The time required to accomplish quantitative hydrogenation seldom exceeds two hours and in most cases is only 15–45 minutes. The reaction is characterized by a very rapid absorption of hydrogen during the first 15-30 minutes accompanied by evolution of heat, followed by a brief period of absorption at a slower rate which terminates abruptly when quantitative hydrogenation has been accomplished.

This invention may be applied to the preparation of a wide variety of hydrogenated esters of phthalic acids. The products thus obtained have useful applications in the preparation of new and improved solvents, plasticizers, and perfume fixatives, and as raw materials for the preparation of the corresponding hexahydrophthalyl alcohols by carboxyl hydrogenation.

The advantages of this invention lie in the fact that, owing to the higher temperatures and pressures employed as compared with the prior art, the time cycle required to complete the hydrogenation is materially reduced, thereby increasing the economic efficiency of the process. The use of high pressures minimizes the adverse effect of impurities, such as sulfur compounds which would otherwise poison the catalyst and decomposition losses frequently occurring at high temperatures in the presence of nickel catalysts are avoided by virtue of the considerably reduced time of contact of reactants with catalyst.

As many apparently widely different embodiments of this invention may be made without departing from the spirit and scope thereof, it is to be understood that I do not limit myself to the specific embodiments thereof except as defined in the appended patent claims.

I claim:

1. The process of selectively hydrogenating the ring of an aromatic ester, which comprises reacting a dialkyl ester of a phthalic acid and hydrogen in the presence of a hydrogenating metal catalyst at a temperature within the range of 160° to 260° C. and at a pressure within the range of 750 to 5000 pounds per square inch, said ester being a phthalic acid ester of an alcohol having at least eight carbon atoms.

2. The process of selectively hydrogenating the ring of an aromatic ester, which comprises reacting a dialkyl ester of a phthalic acid and hydrogen in the presence of a hydrogenating metal catalyst at a temperature within the range of 160° to 260° C. and at a pressure within the range of 750 to 5000 pounds per square inch, said ester being a phthalic acid ester of a mixture of alcohols obtainable by the carboxyl hydrogenation of coconut oil.

3. The process of selectively hydrogenating the rings of aromatic esters, which comprises reacting a mixture of dialkyl phthalates with hydrogen at a temperature of about 180-240° C. and at a pressure of about 2000 pounds per square inch, said mixture of phthalates being obtainable by the esterification of phthalic acid with a mixture of 8 to 18 carbon straight chain primary alcohols boiling within the range of 98° C. to 220° C. at 20 mm. pressure and obtained from the carboxyl hydrogenation of coconut oil.

4. A mixture of dialkyl hexahydro phthalates obtainable by reacting a mixture of dialkyl phthalates with hydrogen at a temperature of about 180-240° C. and at a pressure of about 2000 pounds per square inch, said mixture of phthalates being obtained by the esterification of phthalic acid with a mixture of 8 to 18 carbon straight chain primary alcohols boiling within the range of 98° C. to 220° C. at 20 mm. pressure and obtained from the carboxyl hydrogenation of coconut oil.

5. The process of selectively hydrogenating the ring of an aromatic ester, which comprises reacting the ring of a dialkyl ester of a phthalic acid and hydrogen in the presence of a hydrogenating metal catalyst at a temperature within the range of 160° to 260° C. and at a pressure within the range of 750 to 5000 pounds per square inch, said ester being a phthalic acid ester of an alcohol obtainable by the carboxyl hydrogenation of coconut oil.

WILLIAM JOHN AMEND.